(12) United States Patent
Morgan et al.

(10) Patent No.: US 11,783,551 B2
(45) Date of Patent: Oct. 10, 2023

(54) AUGMENTED REALITY (AR) DEVICE SUPPORT

(71) Applicant: NCR Corporation, Atlanta, GA (US)

(72) Inventors: Kip Oliver Morgan, Atlanta, GA (US); Gina Torcivia Bennett, Lawrenceville, GA (US); Kelli Lee, Atlanta, GA (US); Caleb Wayne Martinez, Fayetteville, GA (US); Jacob Alexander Poston, Loganville, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 17/513,141

(22) Filed: Oct. 28, 2021

(65) Prior Publication Data

US 2023/0137484 A1    May 4, 2023

(51) Int. Cl.
*G06T 19/00*    (2011.01)
*G06T 13/20*    (2011.01)
*G06K 7/14*    (2006.01)
*G06F 3/01*    (2006.01)
*G06K 7/10*    (2006.01)

(52) U.S. Cl.
CPC ............ *G06T 19/006* (2013.01); *G06F 3/012* (2013.01); *G06F 3/013* (2013.01); *G06F 3/017* (2013.01); *G06K 7/10722* (2013.01); *G06K 7/1417* (2013.01); *G06T 13/20* (2013.01); *G06T 2213/12* (2013.01)

(58) Field of Classification Search
CPC ................................................... G06T 19/006
See application file for complete search history.

(56) References Cited

U.S. PATENT DOCUMENTS 10,957,167 B1 *  3/2021  Moore ................. G06T 19/006
2017/0308751 A1 * 10/2017  Kim ...................... G06V 40/19
2020/0160601 A1 *  5/2020  Shreve ................... G06F 30/00

* cited by examiner

*Primary Examiner* — Shivang I Patel
(74) *Attorney, Agent, or Firm* — Schwegman Lundberg & Woessner, P.A.

(57) ABSTRACT

A managed device associated with an error code is identified. An animation associated with physically manipulating a component and parts of the component for the managed device is generated. The animation representing a workflow for resolving the error code. A live video feed of the managed device and the physical surroundings of the managed device is presented within an Augmented Reality (AR) interface on a mobile device operated by a support person. The animation is rendered over a portion of the live video feed for the support person to view while following the workflow and physically manipulating the component and parts of the managed device to resolve the error code.

20 Claims, 3 Drawing Sheets

AUGMENTED REALITY (AR) DEVICE SUPPORT

BACKGROUND

Retailers maintain a variety of devices accessed by employees of the retailers and accessed by customers of the retailers. For example, Self-Service Terminals (SSTs) or kiosks permit customers to self-checkout or purchase specific items; Point-Of-Sale (POS) terminals permit attendants to perform assisted checkouts or returns on behalf of customers; and Automated Teller Machines (ATMs) permit customers to perform self-financial transactions with their banks in retailer locations for purposes of obtaining account balances, transferring funds between customer accounts, withdrawing funds, and/or depositing funds.

It is not just SSTs, kiosks, POS terminals, and ATMs within the retail environments as retailers are deploying a variety of standalone electromechanical devices for access while customers are in the store, such as standalone scanners for price checks, touch displays for navigational guidance, weigh scales for weighing items, etc.

Each of these electromechanical devices must be maintained and supported by either staff of the retailer or by third-party service organizations hired for support by the retailer. Support staff must be trained on typical support required and maintenance on each type of retail device. Staffing shortages have become a significant issue across all industries but especially in the retail industry as the pandemic wanes and restrictions are lifted. Retailers are at the same time experiencing unprecedented demand as consumers return to normal activities following the pandemic.

Some maintenance and support can be very simple, such as replenishing receipt paper (although in some devices such as ATMs this may be more complex than one would assume) while other tasks can be quite complex, such as finding a failing device sensor in complex machine such as an SST or an ATM.

Unsurprisingly, the training curve and turnover is high for support personnel. When devices are unable to service customers, the retailer loses revenue on lost sales and customers become dissatisfied with the retailer, which could result in negative retailer reviews and lost future customers.

Thus, there is a need in the industry to substantially simplify device support and to streamline support workflows.

SUMMARY

In various embodiments, a system and methods for an Augmented Reality (AR)-based device diagnostic service are provided.

According to an embodiment, a method for providing an AR-based device diagnostic service is presented. An error code that is associated with a managed device is identified and a workflow of tasks associated with resolving the error code is obtained. An animation is generated that illustrates physical manipulations of a physical component of the managed device to resolve the error code based on the workflow. The animation is rendered within a live video feed of the managed device in an AR interface on a display of a mobile device that is operated by a support person.

DETAILED DESCRIPTION

Figure 1:
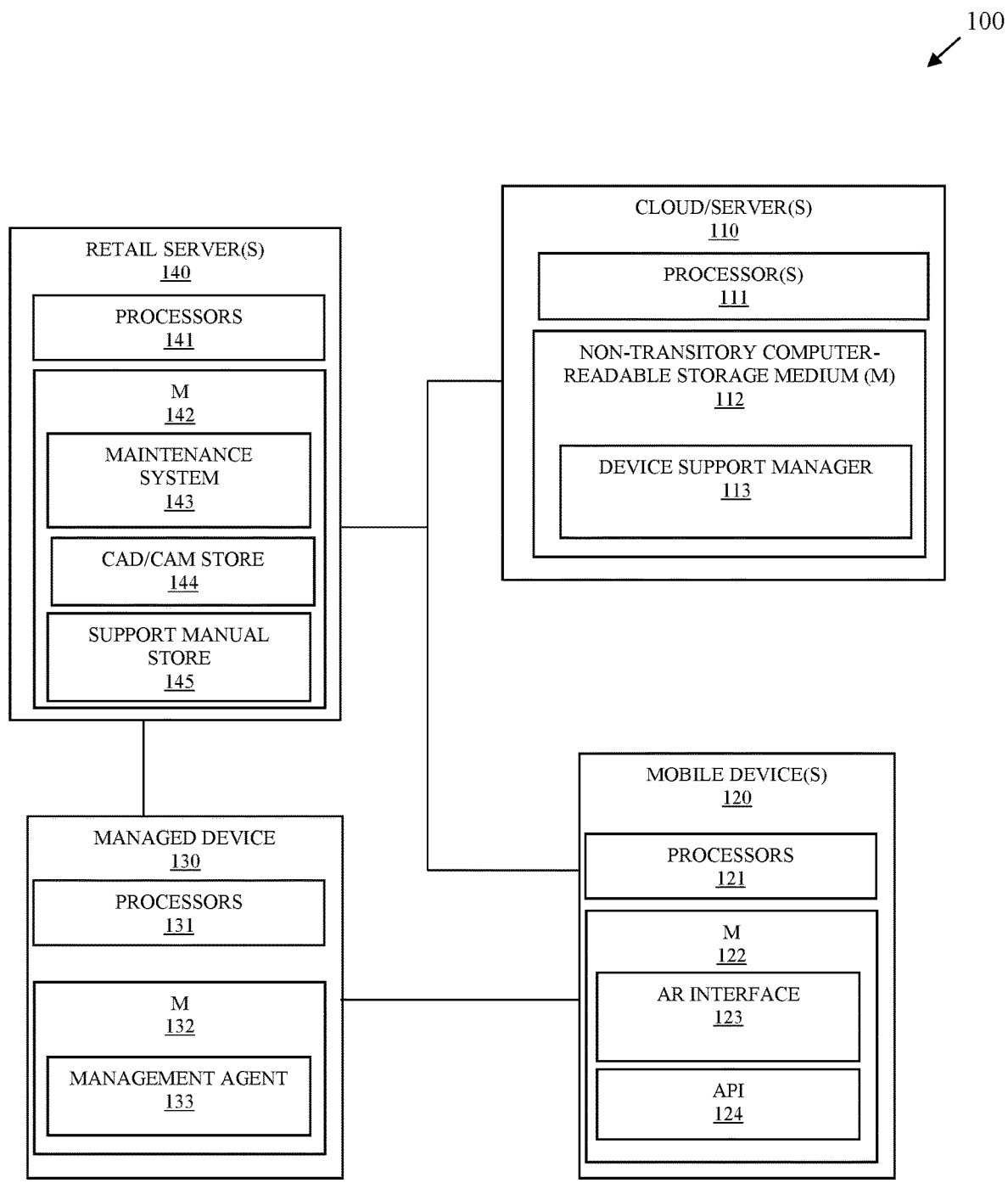
FIG. 1 is a diagram of a system for providing an AR-based device diagnostic service, according to an example embodiment.

FIG. 1 is a diagram of a system/platform 100 for providing an AR-based device diagnostic service, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of providing an AR-based device diagnostic service, presented herein and below.

System/platform 100 (herein after just "system 100") provides a processing environment by which support personnel are notified when a managed device encounters a problem that requires attention. A mobile device of the support person is operated to capture an image of the managed device and/or a special code affixed to the managed device. The specific type of managed device is identified, and Computer-Aided Design and Manufacturing (CAD/CAM) files and a support manual for the device are retrieved.

An Augmented Reality (AR) interface is rendered on the mobile device of the support person that permits a live video feed of the physical environment surrounding the managed device and the managed device to be viewed on a display of the mobile device along with superimposed instructional video clips comprised from the CAD/CAM files and/or support manual that illustrate the maintenance actions required of the support personnel to address the problem. The step-by-step workflow is obtained from the support manual for fixing the problem, and the workflow is interactively rendered for the support person within a portion of the live video feed to guide the support person in performing all tasks necessary to correct the problem encountered by the managed device. As the support person follows the step-by-step workflow of tasks, the AR interface of the mobile device records a video clip for auditing and further training of the support staff of an enterprise.

As used herein, the terms/phrases "user," "service engineer," "support person," "customer engineer," "support staff," and/or "support personnel," may be used interchangeably and synonymously herein and below. This refers to an individual who is operating a mobile device that comprises the novel AR interface and is responsible for fixing a problem with a managed device within an enterprise.

As used herein, "a managed device" is an electromechanical device that requires support and maintenance for normal operation within an enterprise. A managed device can be an SST, a POS terminal, an ATM, a kiosk, a digital touch display, a standalone printer, a standalone scanner, or any other type of device that is supported by an enterprise.

A "problem" reported by or identified for a managed device can refer to any condition that requires a maintenance or a support action of a support person to address the condition. For example, a problem can be a jam detected along an internal pathway of the managed device, low or out of media (paper, ink, ribbon, currency, etc.), failure in a sensor or a component of the managed device (e.g., failed printhead, failed media detection sensor, an illumination source failed internally to the managed device, etc.), and any other condition requiring a support action of a support person.

The terms "problem," "problem code," "error," and/or "error code" may be used interchangeably and synonymously herein and below.

It is within this context that system 100 is now discussed with reference to FIG. 1.

System 100 comprises a cloud/server 110, a plurality of mobile devices 120, a plurality of managed devices 130, and one or more retail servers 140.

Cloud/Server 110 comprises at least one processor 111 and a non-transitory computer-readable storage medium 112. Medium 112 comprises executable instructions for a device support manager 113. The executable instructions when provided to and executed by processor 111 from medium 112 cause processor 111 to perform the processing discussed herein and below for device support manager 113.

Each mobile device 120 comprises at least one processor 121 and a non-transitory computer-readable storage medium 122. Medium 122 comprises executable instructions for an AR interface 123 and an Application Programming Interface (API) 123. The executable instructions when provided to and executed by processor 121 from medium 122 cause processor 121 to perform the processing discussed herein and below for AR interface 123 and API 124.

Each managed device 130 comprises at least one processor 131 and a non-transitory computer-readable storage medium 132. Medium 132 comprises executable instructions for a management agent 133. The executable instructions when provided to and executed by processor 131 from medium 132 cause processor 131 to perform the processing discussed herein and below for management agent 133.

Each retail server 140 comprises at least one processor 141 and a non-transitory computer-readable storage medium 142. Medium 142 comprises executable instructions for a maintenance system 143. The executable instructions when provided to and executed by processor 141 from medium 142 cause processor 141 to perform the processing discussed herein and below for maintenance system 143. Medium 142 also comprises executable instructions for interfaces to search a CAD/CAM store 144 and a support manual store 145.

A retail environment or a store has existing workflows and managed devices and a maintenance system, which permits the store to receive notifications of problems associated with the managed devices and initiate a designated workflow associated with resolving the problem. These existing workflows may be utilized and integrated with system 100 but as will be described herein and below are not necessary to be integrated in some embodiments of system 100 and in other embodiments are enhanced with the teachings presented herein.

Initially, CAD/CAM files from the CAD/CAM store 114 are tagged with manufacturer error data obtained from support manuals of the support manual store 145. Each component and the corresponding three-dimensional (3D) coordinates of each component within the corresponding CAD/CAM files are tagged with the error code obtained from the corresponding manufacturer's support manual.

Device support manager 113 uses the tagged error codes on the CAD/CAM files along with the component 3D coordinates to create animations as needed for any given managed device 130 and its peripherals/components. The animations follow instructions (resolution workflow of tasks) defined in the corresponding support manual for moving the mechanical parts of a given component in an order and directions defined by the resolution workflow using the corresponding support manual for resolving a given error code. For example, 3D CAD/CAM files for a component printer and its printer parts are labeled with an "out of paper" error code (obtained from a support manual of a managed device 130). The support manual provides detailed instructions (resolution workflow) indicating that part A is to be turned counterclockwise and lifted and part B pulled out, paper inserted into a tray part, part B pushed in, and part A pushed down and turned clockwise. Device support manager 113 creates an animation of the 3D CAD/CAM files for the printer component that follows the movements and directions defined in the support manual using the 3D coordinates of the printer components and the printer's parts.

With the error codes tagged on the CAD/CAM files for a managed device 130, its components, and its component parts and linked to the resolution workflows of the support manuals, device support manager 155 is also able to recall and animate any given component of the managed device 130. When an identifier for the managed device 130 is provided as input to device support manager 113 with an animation request during a support session for an existing error code. The animation request may be received via a Quick Response (QR) code that was placed as a label on a housing of the managed device 130. The QR code may be encoded with the make, model, and serial numbers for both the managed device 130 and each of the components/peripherals. When the forward-facing camera of user device 120 is pointed at the QR code, API 124 sends the QR code to device support manager 113 as an animation request.

The QR code may also be displayed within a screen on a display of managed device 130 when the device 130 is in an administrative mode of operation. The displayed QR code is dynamically generated by agent 133 when device 130 is placed in the administrative mode of operation and presented in a corner of the administrative screens rendered on the display of device 130. Agent 133 detects the installed hardware components, their makes and models, their manufacturers, and their serial numbers. In this embodiment, when maintenance records for the managed device 130 are out of date, the dynamically generated QR code provided by agent 133 is correct and provides the specific and actual build of components within device 130.

Any labeled QR code may comprise a silver color border, such that when captured by device 120, AR interface 123 can easily identify the QR code and gauge a height off the ground from the label to the floor and calibrate actual physical measurements of the physical environment and the device 130 for purposes of a support session with a support person. This allows AR interface 123 to calibrate itself for the physical environment and map components of device 130 being streamed within the live video feed on the display of device 120.

In an embodiment, a single managed device 130 may comprise a plurality of QR labels, each QR label adjacent to or placed on a front-facing surface of a corresponding component of the managed device 130. API 124 provides the component QR codes as a component animation request to device support manager 113. Device support manager 113 generates an animation for the corresponding component and delivers the animation to AR interface 123. AR interface

123 may recalibrate its measurements and physical environment mapping based on detection of each component QR code.

During operation of system 100, when an existing error code is being reported for managed device 130 through agent 133 and/or maintenance system 143, a support person receiving the error code notification operates device 120 and starts a support session with AR interface 123 and device support manager 113. AR interface 123 begins live streaming video from a front-facing camera of device 120 on the display of device 120. The live streamed video is supplied in real time to device support manager 113 for recognition of device 130 appearing in the live streamed video, recognition can be intensified based on a known physical location associated with managed device 130 and reported/calculated locations of the objects in the video feed by support manager 113. In some cases, the support session is started once the support person is physically located at the managed device with the error code such that automatic recognition of the managed device 130 within the live video feed is unnecessary. In some cases, the support session starts when the support person points the front-facing camera at the managed device's QR code (displayed on the display of managed device 130 or on an external surface of managed device 130). In some cases, device support manager 113 provides superimposed route guidance into the live video stream that routes the support person to the managed device 130 from a current location of device 130, such that the support session includes superimposed route guidance from the support person's current location within the enterprise to the managed device's location within the enterprise.

When a QR code is scanned, the code is used as an anchor point for AR interface to measure and map the physical environment and the managed device 130 and its components. Device support manager utilizing the CAD/CAM files, support manual, and error code, provides the precise coordinates within the live video feed for the component of the managed device 130 that needs to be addressed to AR interface 123. AR interface 123 superimposes/highlights the location within the live video feed being viewed by the support person using the coordinates. This allows the support person to quickly visualize where the component is at within the housing of managed device 130.

The support person can use a variety of hand gestures placed in the field of view of the front-facing camera within the live video stream and/or uses a variety of eye or facial gestures made by the support person to a rear-facing camera of device 130 for purposes of providing input commands to AR interface 123 during a support session. For example, a hand placed over the managed device 130 or swiped over the managed device 130 within the live video stream can be translated into a command recognized by AR interface 123 that the support person is ready to begin the repair or maintenance action on managed device 130. AR interface 123 obtains the 3D animation of the component and component parts that correspond to the maintenance action from device support manager 113 and plays the animation on top of the live video stream. The user can use further gestures to move the location of the animation to any user-directed location within the live video stream, can pause the animation, rewind the animation, or fast forward the animation. The animation may include audio with voice guidance that is played through speakers of device 120 with the animation.

In an embodiment, once the support person starts the maintenance action through AR interface 123, AR interface 123 records the live stream video captured by the front-facing camera of device 120. The recording is sent as a video clip to device support manager 113 at the conclusion of the support session and may be used to gather metrics (via time stamps) and analysis for training and support by the enterprise.

A variety of additional operational scenarios of system 100 are now presented for further illustration.

When a managed device 130 (such as an SST 130) of the store goes into a failure mode, many things are known about the state of the SST 130 through management agent 133 and maintenance system 143. For example, the devices 130 and/or sensors that are failing are known for particular hardware models of the devices 130. The maintenance system 143 sends out alerts indicating that the hardware of a device 130 has a problem to user device 120. The sensors activated for each hardware problem are typically known. For example, if a coin is jammed in a coin accepter or dispenser of an SST 130, the coin is known to be behind the top door of the coin accepter or dispenser peripheral. Because CAD and three-dimensional (3D) models are detailed, the areas of the individual hardware components of the coin accepter or dispenser peripheral can be tagged and labeled with its 3D coordinates.

For example, if a hardware manufacturer publishes via a support manual that an error code of C corresponds with sensor Y, the 3D model of that part is tagged with error code X and the 3D coordinates of sensor Y. In addition, if procedure Z (workflow Z) is recommended by the manufacturer as a fix for error code X, a 3D animator processed by device support manager 113 creates an animation from the manufacturer's instructions indicating how to fix the problem. For example, if the error is associated with "printer is out of paper," the location inside the known managed device 130 where the printer paper tray is located is shown via AR interface 123 in cooperation with device support manager 113 on a display of mobile device 120 in a semi-transparent 3D overlay of the device's CAD model using CAD/CAM store 144. When the support person indicates they are ready to fix via a predefined hand gesture made in front of a forward-facing camera of user device 120 while the support person is operating AR interface 123, AR interface 123 translates this hand gesture as an input command to obtain the 3D animation from device support manager 113 and play the animation on the display of mobile device 120 on top of the live video feed being presented on the display by the AR interface 123. This animation shows the doors that need to be unlatched, where to move the opened doors, and how to feed the paper into the paper tray into the internal printer peripheral of the SST 130. When the support person does not desire to play the animation, another hand gesture made in front of the forward-facing camera of mobile device 120 can cause AR interface 123 to move the animation to a floor space located in the live video stream being presented on the display of mobile device 120 to clearly fix the animation in the same dimensions and perspective as the SST 130 or printer peripheral as it is being viewed on the display by the support person.

When the support person believes that the problem is fixed, a user-interface button within the AR interface 123 and presented with the live video stream can be activated by the support person stating, "I corrected the problem." When the managed device 130 detects the problem is fixed, device 130 does a health check and resumes normal operation. Should the error code or problem code be raised again, the process can be repeated.

In an embodiment, device support manager 113 may further obtain a service history or service records for a given managed device 130 or a component peripheral of the given managed device 130 from maintenance system 143. A support person gesture or displayed button option within AR interface 123 may permit device support manager 113 to deliver the support records in a superimposed window within the live video feed for access by the support person. A given support record can be selected via a gesture and displayed to the support person. This may be particular useful in complex situations to view notes of a prior support person.

In an embodiment, AR interface 123 may present an option for the support person at the close of support session to enter or speak maintenance notes that are provided by AR interface 123 to support manager 113 and updated in a support record for the support session with maintenance system 143.

In an embodiment, commands associated with controlling the animation for the maintenance workflow can be controlled via facial gestures or eye gestures (blinks, closed eye, both eyes closed) to a rear-facing camera of device 120. The gestures are translated into the commands by AR interface 123 and processed.

In an embodiment, AR interface 123 may receive input commands from a support person during a support session through hand gestures made in front of a front-facing camera of device 120, eye or facial gestures made to a rear-facing camera of device 120, and/or through speech commands recorded by a microphone of device 120.

In an embodiment, device 120 is a tablet, glasses, a phone, or a laptop.

In an embodiment, managed device 130 is an SST, an ATM, a kiosk, standalone scanner, a digital display, a standalone weigh scale, a standalone printer, a standalone card reader, a standalone biometric scanner, or a standalone payment station (media depository/recycler).

In an embodiment, the device support manager 113 is subsumed into retail server 140 and provided from retailer server 140 to mobile device 120.

In an embodiment, the CAD/CAM store 144 is not physically tagged with the error codes; rather, device support manager 113 maintains a mapping between error codes to the corresponding CAD/CAM files and to resolution workflows of the corresponding support manuals.

In an embodiment, each component of the managed device 130 is labeled with its own QR code and during a support session when the workflow includes initial tasks for the support person, if the support person scans the QR code for a given component, the workflow jumps ahead to the portion of the workflow directly associated with the component. For example, instructions to open the main housing in a workflow can be bypassed when the support person has already opened the main housing and exposed the printer component associated with the error code and places the printer's QR code into the live video feed; this cause the workflow to jump directly ahead and the animation to skip ahead to the portion relevant to manipulating the printer component.

Figure 2:
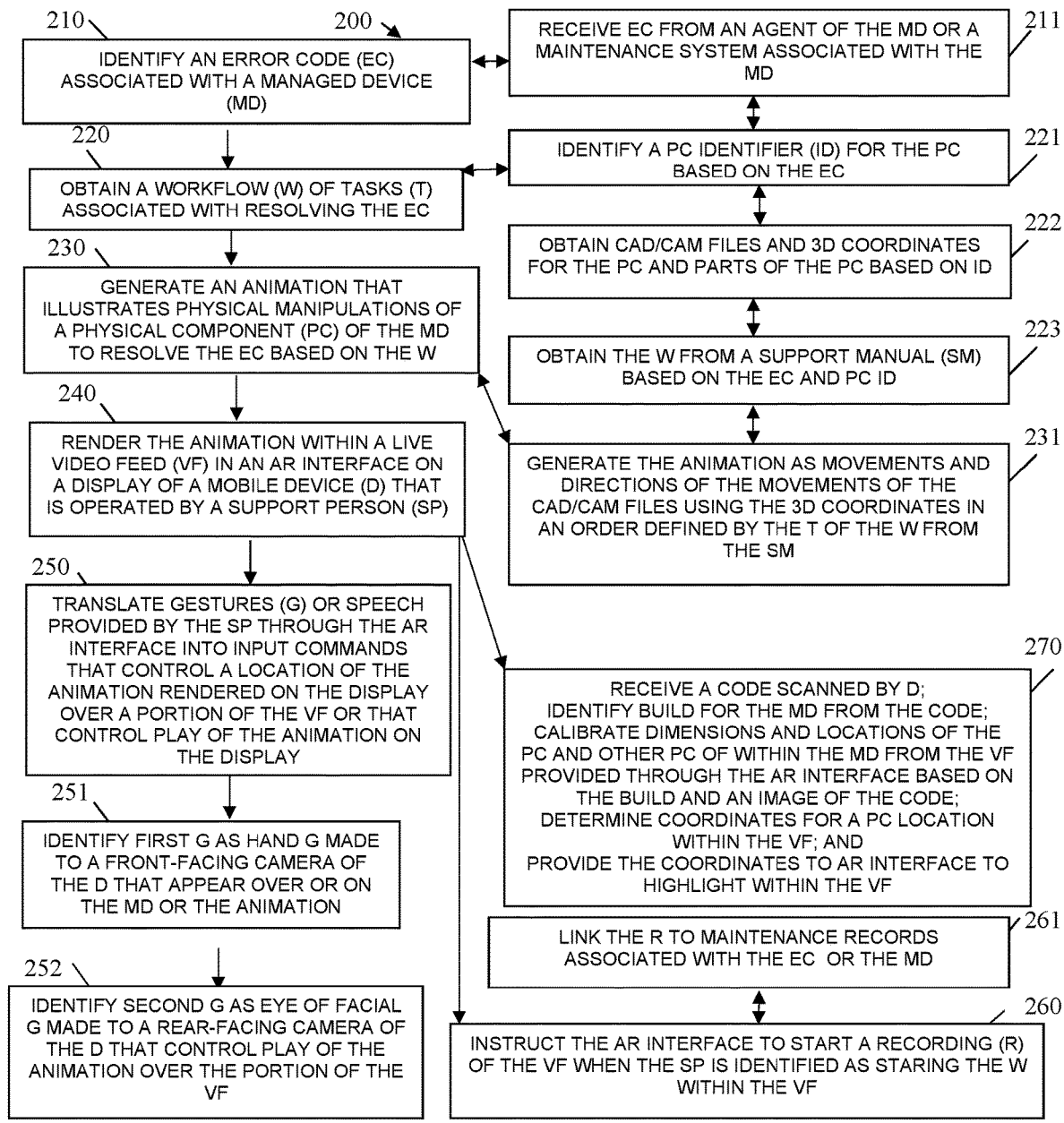
FIG. 2 is a diagram of a method for providing an AR-based device diagnostic service, according to an example embodiment.
Figure 3:
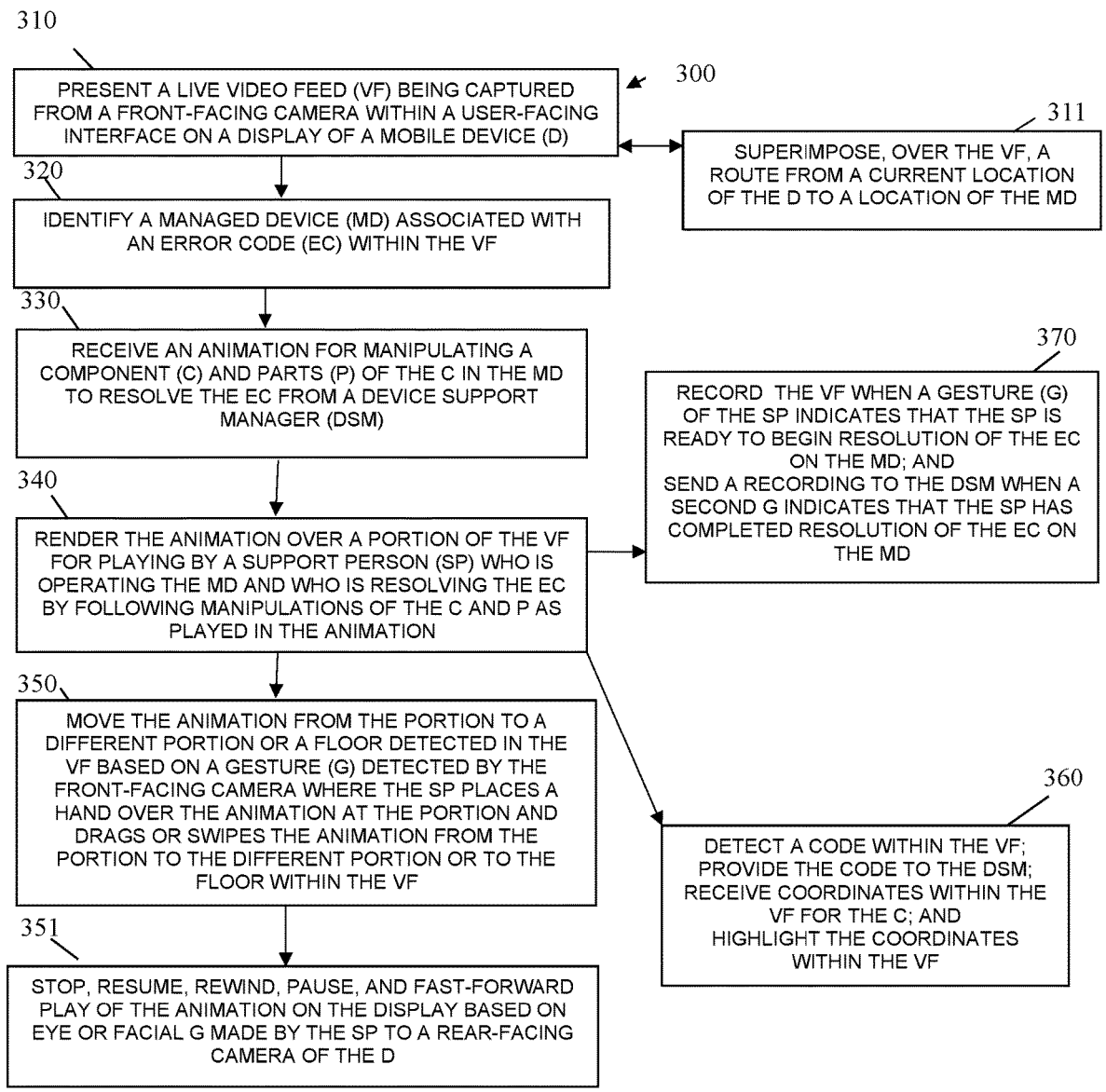
FIG. 3 is a diagram of another method for providing an AR-based device diagnostic service, according to an example embodiment.

The above-referenced embodiments and other embodiments are now discussed within FIGS. 2-3.

FIG. 2 is a diagram of a method 200 for providing an AR-based device diagnostic service, according to an example embodiment. The software module(s) that implements the method 200 is referred to as an "AR-based device diagnostic service." The AR-based device diagnostic service is implemented as executable instructions programmed and residing within memory and/or a non-transitory computer-readable (processor-readable) storage medium and executed by one or more processors of one or more devices. The processor(s) of the device that executes the AR-based device diagnostic service are specifically configured and programmed to process the AR-based device diagnostic service. The AR-based device diagnostic service may have access to one or more network connections during its processing. The network connections can be wired, wireless, or a combination of wired and wireless.

In an embodiment, the device that executes the AR-based device diagnostic service is cloud 110. Cloud 110 comprises a plurality of servers logically cooperating and accessible as a single server 110 (cloud 110).

In an embodiment, the device that executes the AR-based device diagnostic service is a server 110 that is separate from any given retail server 140.

In an embodiment, the device that executes the AR-based device diagnostic service is retail server 140.

In an embodiment, the AR-based device diagnostic service is all or some combination of 113, 123, and/or 124.

At 210, the AR-based device diagnostic service identifies an error code associated with a managed device 130.

In an embodiment, at 211, the AR-based device diagnostic service receives the error code from a management agent 133 or a maintenance system 143.

At 220, the AR-based device diagnostic service obtains a workflow of tasks associated with resolving the error code on the managed device 130.

In an embodiment of 211 and 220, at 221, the AR-based device diagnostic service identifies a particular component identifier for a particular component of the managed device 130 based on the error code.

In an embodiment of 221 and at 222, the AR-based device diagnostic service obtains CAD/CAM files and 3D coordinates for the particular component and parts of the particular component based on the particular component identifier.

In an embodiment of 222 and at 223, the AR-based device diagnostic service obtains the workflow from a support manual based on the error code and the particular component identifier.

At 230, the AR-based device diagnostic service generates an animation that visual illustrates physical manipulations of the physical component and the parts of the physical component for the managed device 130 to resolve the error code based on the workflow of tasks.

In an embodiment of 223 and 230, at 231, the AR-based device diagnostic service generates the animation as movements and directions of the movements of the CAD/CAM files using the 3D coordinates in an order defined by the tasks of the workflow from the support manual.

At 240, the AR-based device diagnostic service renders the animation in an AR interface 123 on a display of a mobile device 120 that is being operated by a support person.

In an embodiment, at 250, the AR-based device diagnostic service translates gestures or speech provided by the support person through the AR interface 123 into input commands that control a location of the animation rendered on the display over a portion of the live video feed or that controls play of the animation on the display of the mobile device 120.

In an embodiment of 250 and at 251, the AR-based device diagnostic service identifies first gestures as hand gestures made to a front-facing camera of the mobile device 120 that appear over or on the managed device 130 or the animation.

In an embodiment of 251 and at 252, the AR-based device diagnostic service identifies second gestures as eye or facial gestures made to a rear-facing camera of the mobile device 120 that control the play of the animation over the portion of the video feed.

In an embodiment, at 260, the AR-based device diagnostic service instructs the AR interface 123 to start a recording of the live video feed when the support person is identified as starting the workflow within the live video feed.

In an embodiment of 260 and at 261, the AR-based device diagnostic service links the recording to maintenance records associated with the error code and/or the managed device 130.

In an embodiment, at 270, the AR-based device diagnostic service receives a code scanned by the mobile device 120 (code was detected in the live video feed). The AR-based device diagnostic service uses the code to identify a hardware build for the managed device 130 and calibrates dimensions and locations of the particular component and other components within the managed device 130 from the live video feed provided through the AR interface 123 based on the hardware build and an image of the code within the live video feed. The AR-based device diagnostic service determines coordinates for a particular component location within the video feed based on the calibration and the AR-based device diagnostic service provides the coordinates to the AR interface 123 to visually distinguish and highlight the coordinates of the particular component and to track the coordinates within the live video feed as the mobile device 120 moves or changes orientations based on movements of the support person.

FIG. 3 is a diagram of another method 300 for providing an AR-based device diagnostic service, according to an example embodiment. The software module(s) that implements the method 300 is referred to as an "AR device support interface." The AR device support interface is implemented as executable instructions programmed and residing within memory and/or a non-transitory computer-readable (processor-readable) storage medium and executed by one or more processors of a device. The processors that execute the AR device support interface are specifically configured and programmed for processing the AR device support interface. The AR device support interface may have access to one or more network connections during its processing. The network connections can be wired, wireless, or a combination of wired and wireless.

In an embodiment, the device that executes the AR device support interface is device 120. In an embodiment, device 120 is an AR-enabled mobile device, such as a phone, a tablet, glasses, a watch, or a laptop.

In an embodiment, the AR device support interface is all of or some combination of 123 and/or 124.

The AR device support interface interacts with cloud/server 110 as discussed with system 100 and as discussed with method 200 discussed above with FIGS. 1 and 2, respectively.

At 310, the AR device support interface presents a live video feed/stream being captured by a front-facing camera within a user-facing interface on a display of a mobile device 120 operated by a support person.

In an embodiment, at 311, the AR device support interface superimposes, over the live video feed, a route from a current location of the mobile device 120 to a known location of a managed device 130.

At 320, the AR device support interface identifies the managed device associated with an error code within the video feed.

At 330, the AR device support interface receives an animation for manipulating a component and parts of the component in the managed device 130 to resolve the error code from a device support manager 113.

At 340, the AR device support interface renders the animation over a portion of the live video feed for playing by the support person who is operating the mobile device 120 and who is resolving the error code by following the manipulations of the component and the parts as played in the animation.

In an embodiment, at 350, the AR device support interface moves the animation from the portion to a different portion or a floor detected in the live video feed based on a gesture detected by a front-facing camera of the mobile device 120 where the support person places a hand over the animation at the portion and drags or swipes the animation from the portion to the different portion or to the floor within the live video feed.

In an embodiment of 350 and at 351, the AR device support interface stops, resumes, rewinds, pauses, and fast-forwards play of the animation on the display of the mobile device 120 based on eye or facial gestures made by the support person to a rear-facing camera of the mobile device 120.

In an embodiment, at 360, the AR device support interface detects a code within the live video feed and provides the code to the device support manager 113. The AR device support interface receives coordinates within the live video feed for the component and the AR device support interface highlights the coordinates within the live video feed.

In an embodiment, at 370, the AR device support interface records the live video feed when a gesture of the support person or an action of the support person indicates that the support person is ready to begin or has started resolution of the error code on the managed device 130. The AR device support interface sends the recording to the device support manager 113 when a second gesture or second action indicates that the support person has completed resolution of the error code on the managed device 130.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
identifying an error code associated with a managed device;
obtaining a workflow of tasks associated with resolving the error code;
generating an animation that illustrates physical manipulations of a physical component of the managed device to resolve the error code based on the workflow;
rendering the animation within a live video feed of the managed device in an Augmented Reality (AR) interface on a display of a mobile device that is operated by a support person, wherein rendering further includes rendering a user-interface button within the AR interface that when activated indicates that the error code was resolved and causes the managed device to perform a health check and resume normal operation when the error code is not present following the health check; and
responsive to a certain gesture of the support person superimposing a window within the live video feed within the display of the mobile device that is populated with support records of the managed device and responsive to a different certain gesture selecting a given support record and displaying details for the given support record within the window.

2. The method of claim 1 further comprising, translating gestures or speech provided by the support person through the AR interface into input commands that control a location of the animation rendered on the display over a portion of the video feed or that control play of the animation within the live video feed.

3. The method of claim 2 further comprising, identifying first gestures as hand gestures made to a front-facing camera of the mobile device that appear over or on the managed device or the animation.

4. The method of claim 3 further comprising, identifying second gestures as eye or facial gestures made to a rear-facing camera of the mobile device as select commands that control play of the animation over the portion of the video feed.

5. The method of claim 1 further comprising, instructing the AR interface to start a recording of the live video feed when the support person is identified as starting the workflow within the video feed.

6. The method of claim 5 further comprising, linking the recording to a maintenance records associated with the error code or the managed device.

7. The method of claim 1 further comprising:
receiving a code scanned by a front-facing camera of the mobile device through the AR interface;
identifying a hardware build comprising the physical component and other physical components for the managed device from the code;
calibrating dimensions and locations of the physical component and the other physical components within the managed device from the live video feed being provided through the AR interface based on the hardware build and an image of the code provided within the live video feed;
determining coordinates for a component location within the live video feed based on the calibrating; and
providing the coordinates to the AR interface for the AR interface to highlight the coordinates within the live video feed to direct an attention of the support person to the component location.

8. The method of claim 1, wherein identifying the error code further includes receiving the error code from a management agent of the managed device or a maintenance system associated with the managed device.

9. The method of claim 8, wherein identifying further includes identifying a component identifier for the physical component based on the error code.

10. The method of claim 9, wherein identifying the component identifier further includes obtaining Computer Aided Design/Computer Aided Manufacturing (CAD/CAM) files and three-dimensional (3D) coordinates for the physical component and parts of the physical component based on the component identifier.

11. The method of claim 10, wherein obtaining further includes obtaining the workflow from a support manual based on the error code and the component identifier.

12. The method of claim 11, wherein generating further includes generating the animation as movements and directions of the movements of the CAD/CAM files using the 3D coordinates in an order defined by the tasks of the workflow from the support manual.

13. A method, comprising:
presenting a live video feed being captured from a front-facing camera within a user-facing interface on a display of a mobile device;
identifying a managed device associated with an error code within the live video feed;
receiving an animation for manipulating a component and parts of the component in the managed device to resolve the error code from a device support manager;
rendering the animation over a portion of the live video feed for playing by a support person who is operating the mobile device and who is resolving the error code by following manipulations of the component and the parts as played in the animation, wherein rendering further includes rendering a user-interface button within the live video feed that when activated indicates that the support person resolved the error code causing the managed device to perform a health check and resume normal operation when the error code is not present following the health check; and
responsive to a certain gesture of the support person superimposing a window within the live video feed within the display of the mobile device that is populated with support records of the managed device and responsive to a different certain gesture selecting a given support record and displaying details for the given support record within the window.

14. The method of claim 13, wherein presenting further includes superimposing, over the live video feed, a route from a current location of the mobile device to a location of the managed device.

15. The method of claim 13 further comprising, moving the animation from the portion to a different portion or a floor detected in the live video feed based on a gesture detected by the front-facing camera where the support person places a hand over the animation at the portion and drags or swipes the animation from the portion to the different portion or to the floor within the live video feed.

16. The method of claim 15 further comprising, stopping, resuming, rewinding, pausing, and fast-forwarding play of the animation on the display based on eye or facial gestures made by the support person to a rear-facing camera of the mobile device.

17. The method of claim 13 further comprising:
detecting a code within the live video feed;
providing the code to the device support manager;

receiving coordinates within the live video feed for the component; and highlighting the coordinates within the live video feed.

18. The method of claim 13 further comprising:

recording the live video feed when a gesture of the support person indicates that the support person is ready to begin resolution of the error code on the managed device; and sending a recording associated with the recording to the device support manager when a second gesture indicates that the support person has completed resolution of the error code on the managed device.

19. A system, comprising:

a cloud processing environment comprising at least one server;

the at least one server comprising a processor and a non-transitory computer-readable storage medium;

the non-transitory computer-readable storage medium comprises executable instructions; and the executable instructions when executed on the processor from the non-transitory computer-readable storage medium cause the processor to perform operations comprising:

mapping an error code raised for a managed device to Computer Aided Design/Computer Aided Manufacturing (CAD/CAM) files and three-dimensional (3D) coordinates of a component and parts of the component associated with the error code;

obtaining a workflow of tasks for physically manipulating the component and the parts based on the error code;

generating an animation of performing the tasks from the CAD/CAM files and the 3D coordinates;

rendering the animation over a portion of a live video feed within an Augmented Reality (AR) interface on a display of a mobile device operated by a support person when the managed device is detected within the live video feed, wherein rendering further includes rendering a user-interface button within the AR interface that when activated indicates that error code was resolved and causing the managed device to perform a health check and resume normal operation when the error code is not present following the health check; and responsive to a certain gesture of the support person superimposing a window within the live video feed within the display of the mobile device that is populated with support records of the managed device and responsive to a different certain gesture selecting a given support record and displaying details for the given support record within the window.

20. The system of claim 19, wherein the executable instructions further include additional executable instruction that further cause the processor to perform additional operations comprising:

detecting a code within the live video feed;

obtaining a hardware build for the managed device based on the code;

determining coordinates of the component within the live video feed based on using the location of the code presented within the live video feed, mapping the physical environment presented in the live video feed relative to the location of the code, and using the hardware build to identify a component location for the component;

tracking the coordinates of the components relative to the physical environment as the live video feed changes based on movements of the support person operating the mobile device; and providing the coordinates to the AR interface to highlight within the live video feed as the user views the live video feed on the display of the mobile device;

wherein the mobile device is glasses, a phone, a tablet computer, or a laptop computer.

* * * * *